United States Patent
Karkra et al.

(10) Patent No.: US 12,417,146 B2
(45) Date of Patent: Sep. 16, 2025

(54) METHOD AND APPARATUS TO IMPROVE PERFORMANCE OF A REDUNDANT ARRAY OF INDEPENDENT DISKS THAT INCLUDES ZONED NAMESPACES DRIVES

(71) Applicant: Intel Corporation, Santa Clara, CA (US)

(72) Inventors: Kapil Karkra, Chandler, AZ (US); Slawomir Ptak, Gdansk (PL); Mariusz Barczak, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 647 days.

(21) Appl. No.: 17/716,769

(22) Filed: Apr. 8, 2022

(65) Prior Publication Data
US 2022/0229722 A1 Jul. 21, 2022

(51) Int. Cl.
*G06F 11/10* (2006.01)
*G06F 3/06* (2006.01)

(52) U.S. Cl.
CPC .......... *G06F 11/108* (2013.01); *G06F 3/0619* (2013.01); *G06F 3/0634* (2013.01); *G06F 3/0689* (2013.01); *G06F 11/1092* (2013.01)

(58) Field of Classification Search
CPC .... G06F 11/108; G06F 3/0619; G06F 3/0634; G06F 3/0689; G06F 11/1092; G06F 3/065; G06F 3/0665
See application file for complete search history.

(56) References Cited

U.S. PATENT DOCUMENTS

| | | | | |
|---|---|---|---|---|
| 2020/0341844 A1* | 10/2020 | Shivanand | .......... | G06F 11/1088 |
| 2021/0349782 A1* | 11/2021 | Ki | .......... | G06F 3/0673 |
| 2023/0315346 A1* | 10/2023 | Karr | ..... | G06F 11/2007 |
| | | | | 711/162 |

OTHER PUBLICATIONS

Kim, Jaeho et al, Improving SSD Reliability with RAID via Elastic Striping and Anywhere Parity, University of Seoul, Dankook University, Hongik University, 2013 IEEE. (Year: 2013).*

Y. Cai, S. Ghose, E. F. Haratsch, Y. Luo and O. Mutlu, "Error Characterization, Mitigation, and Recovery in Flash-Memory-Based Solid-State Drives," in Proceedings of the IEEE, vol. 105, No. 9, pp. 1666-1704, Sep. 2017, doi: 10.1109/JPROC.2017.2713127 (Year: 2017).*

Jim Gray, Bob Horst, and Mark Walker. 1990. Parity striping of disc arrays: low-cost reliable storage with acceptable throughput. In Proceedings of the sixteenth international conference on Very large databases. Morgan Kaufmann Publishers Inc., San Francisco, CA, USA, 148-161. (Year: 1990).*

(Continued)

*Primary Examiner* — Matthew M Kim
*Assistant Examiner* — Kayo Lisa Rusin
(74) *Attorney, Agent, or Firm* — Compass IP Law PC

(57) ABSTRACT

High performance parity-based Redundant Array of Independent Disks (RAID) on Zoned Namespaces Solid State Drives (SSD)s with support for high queue depth write Input Output (IO) and Zone Append command is provided in a host system. The host system includes a stripe mapping table to store mappings between parity strips and data strips in stripes on the RAID member SSDs. The host system also includes a Logical to Physical (L2P) table to store data block addresses returned by the Zone Append command.

19 Claims, 7 Drawing Sheets

(56) References Cited

OTHER PUBLICATIONS

Greenan, Kevin, Building Flexible, Fault-Tolerant Flash-based Storage Systems, University of California, Santa Cruz, Santa Clara University, 2009 (Year: 2009).*

Kim, Thomas. RAIZN: Redundant Array of Independent Zoned Namespace, Parallel Data Laboratory, Carnegie Mellon University, Jan. 2022. (Year: 2022).*

R. Salkhordeh et al., "Constant Time Garbage Collection in SSDs," 2021 IEEE International Conference on Networking, Architecture and Storage (NAS), Riverside, CA, USA, 2021, pp. 1-9, doi: 10.1109/NAS51552.2021.9605386. (Year: 2021).*

Bjorling, Matias, "Zoned Namespaces (ZNS) SSDs: Disrupting the Storage Industry," SDC Storage Developer Conference Sep. 22-23, 2020, 29 pages.

NVM Express, "Zoned Namespace Command Set Specification," Revision 1.1, May 18, 2021.

* cited by examiner

METHOD AND APPARATUS TO IMPROVE PERFORMANCE OF A REDUNDANT ARRAY OF INDEPENDENT DISKS THAT INCLUDES ZONED NAMESPACES DRIVES

FIELD

This disclosure relates to redundant array of independent disks (RAID) systems and in particular to a RAID system with zoned namespaces drives.

BACKGROUND

A Redundant Array of Independent Disks (RAID) combines a plurality of physical drives (hard disk drives (HDDs) or solid state drives (SSDs)) into a logical drive for purposes of reliability, capacity, or performance. Instead of multiple physical drives, an operating system sees the single logical drive. As is well known to those skilled in the art, there are many standard methods referred to as RAID levels for distributing data across the physical drives in a RAID system.

For example, in a level 0 RAID system the data is striped across a physical array of drives by breaking the data into blocks and writing each block to a separate drive. Input/Output (I/O) performance is improved by spreading the load across many drives. Although a level 0 RAID improves I/O performance, it does not provide redundancy because if one drive fails, all of the data is lost A level 5 RAID system provides a high level of redundancy by striping both data and parity information across at least three drives. Data striping is combined with distributed parity to provide a recovery path in case of failure.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

Figure 1:
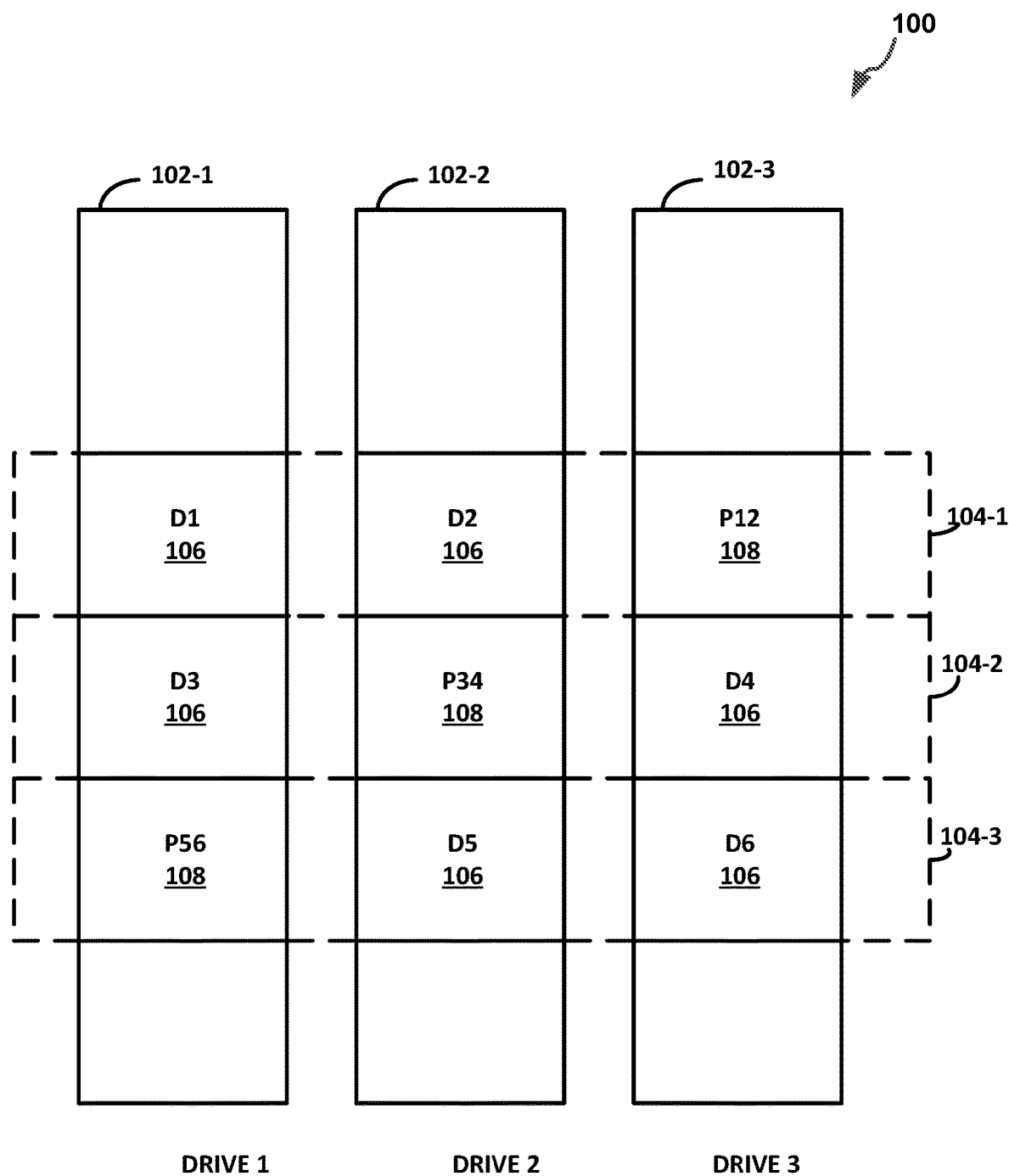
FIG. 1 is a block diagram illustrating the layout of stripes including data strips and parity strips in a level 5 RAID system with three member drives.

FIG. 1 is a block diagram illustrating the layout of stripes 104-1, 104-2, 104-3 including data strips 106 and parity strips 108 in a level 5 RAID system 100 with three member drives 102-1, 102-2, 102-3.

The level 5 RAID system 100 shown in FIG. 1 has three drives 102-1, 102-2, 102-3. Three stripes 104-1, 104-2, 104-3 are shown, with each stripe 104-1, 104-2, 104-3 including two data strips 106 and one parity strip 108.

Data is written to the level 5 RAID system 100 using block-level striping with parity distributed across the disks in a round robin fashion. Sequential data, for example, a file segmented into blocks may be distributed across a stripe, for example, horizontal stripe 104-1, with data block D1 stored in data strip 106 on drive 102-1, data block D2 stored in data strip 106 on drive 102-2 and parity P12 computed for data block D1 and data block D2 stored in parity P12 in parity strip 108 on drive 102-3 in stripe 104-1.

Data block D3 is stored in data strip 106 on drive 102-1, data block D4 is stored in data strip 106 on drive 102-3 and parity P34 computed for data block D3 and data block D4 stored in parity P34 in parity strip 108 on drive 102-2 in stripe 104-2.

Data block D5 is stored in data strip 106 on drive 102-2, data block D6 is stored in data strip 106 on drive 102-3 and parity P56 computed for data block D5 and data block D6 is stored in parity P56 in parity strip 108 on drive 102-1 in stripe 104-3.

To write data to stripes 104-1, 104-2, 104-3, the parity (P12) for data block D1 and data block D2, parity (P34) for data block D3 and data block D4 and parity (P56) for data block D5 and data block D6 is computed in a host system prior to sending write commands to the level 5 RAID system 100. The Logical Block addresses for the parity strips (P12, P34, P56) and the data strips (D1, D2, D3, D4, D5, D6) are selected by a driver in an operating system in the host system. An operating system is software that manages computer hardware and software including memory allocation and access to I/O devices. Examples of operating systems include Microsoft® Windows®, Linux®, iOS® and Android®.

After the parity has been computed and the logical block addresses selected, the host system sends write commands for the data strips and parity strips with the selected logical block addresses to each of the drives 102-1, 102-2, 102-3. The write commands can be sent with a write queue depth greater than one to achieve high write performance.

The parity strips (P12, P34, P56) and the data strips (D1, D2, D3, D4, D5, D6) are stored in stripes 104-1, 104-2, 104-3 on the three member drives 102-1, 102-2, 102-3 as shown in the FIG. 1, so that the parity strip in the stripe is the parity for the data strips in the stripe. If a single member drive fails, an EXclusive OR (XOR) operation can be performed on the strips (two data strips or one data strip and a parity strip) for the stripe stored in the non-failed drives to recover the strip (data or parity) on the failed drive.

Non-Volatile Memory Express (NVMe®) specifications define a register level interface for host software to communicate with a non-volatile memory subsystem (for example, a Solid-state Drive (SSD)) over Peripheral Component Interconnect Express (PCIe), a high-speed serial computer expansion bus). NVMe is the industry standard for SSDs. The NVM Express specifications are available at www.nvmexpress.org. The PCIe standards are available at www.pcisig.com.

The NVM Express® (NVMe®) Base specification defines an interface for host software to communicate with a non-volatile memory subsystem over a variety of memory based transports and message based transports. The NVM Express® Zoned Namespace Command Set Specification defines a specific NVMe I/O Command Set, the Zoned Namespace Command Set, which extends the NVMe Base Specification and the NVM Command Set Specification.

A zoned namespace is a collection of non-volatile memory that is divided into a set of equally-sized zones. The zones are contiguous non-overlapping ranges of logical block addresses. Each zone has an associated Zone Descriptor that contains a set of attributes.

Zoned Namespace SSDs are highly optimized for capacity. However, Zoned Namespace SSDs expose a sequential-only interface for write Input/Output with a queue-depth of 1. The Zoned Namespace Command Set includes a Zone Append command that allows write I/O for a queue-depth greater than one.

The level 5 RAID system 100 relies on the placement of data strips 106 and parity strips 108 in stripes 104-1, 104-2, 104-3 on the RAID member drives 102-1, 102-2, 102-3 to locate data and parity when data is read from the level 5 RAID system 100 and for a RAID rebuild process that needs to match data strips with parity strips when there is a drive failure.

However, the Zone Append command does not allow the Logical Block Addresses for the parity strips (P12, P34, P56) and the data strips (D1, D2, D3, D4, D5, D6) to be selected by a driver in the host system. The Logical Block Addresses are returned by the Zone Namespace SSD after the data has been written to the Zoned Namespace SSD. Using the Zone Append command with queue depth greater than one, the writing of the data strips and parity strips can be reordered and different logical block addresses can be returned from each SSD for the parity strips and data strips for the same stripe. If a single member drive fails, an eXclusive OR (XOR) operation cannot be performed on the strips (two data strips or one data strip and a parity strip) for the stripe because some of the strips no longer correspond from the Logical Block Address perspective.

To ensure that the strips (parity and data) for the same stripe are not reordered in the Zone Namespace SSDs, the write sequence is performed using write I/O with queue-depth 1. Referring to FIG. 1, the parity (P12) for data block D1 and data block D2, parity (P34) for data block D3 and data block D4 and parity (P56) for data block D5 and data block D6 is computed in a host system prior to sending write commands to the level 5 RAID system 100.

A first write command for data strip D1 is sent to member drive 102-1, a first write command for data strip D2 is sent to member drive 102-2, and a first write command for parity strip P12 is sent to member drive 102-3. An LBA is returned from each member drive after the data/parity strip has been written.

After the first write commands have been completed by each of the member drives, a second write command for data strip D3 is sent to member drive 102-1, a second write command for data strip D4 is sent to member drive 102-3, and a second write command for parity strip P34 is sent to member drive 102-2. A LBA is returned from each member drive after the data/parity strip has been written.

After the second write commands have been completed by each of the member drives, a third write command for data strip D5 is sent to member drive 102-2, a third write command for data strip D6 is sent to member drive 102-2, and a third write command for parity strip P56 is sent to member drive 102-1. A LBA is returned from each member drive after the data/parity strip has been written.

Performing the write sequence using write I/O with queue-depth 1 allows data to be recovered for a failed member of the RAID. However, performance of a RAID with queue-depth 1 is low.

High performance parity-based RAID on Zoned Namespaces SSDs with support for high queue depth write IO and Zone Append command is provided in a host system. The host system includes a stripe mapping table to store mappings between parity strips and data strips in stripes on the RAID member SSDs. The host system also includes a Logical to Physical (L2P) table to store data block addresses returned by the Zone Append command.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 2:
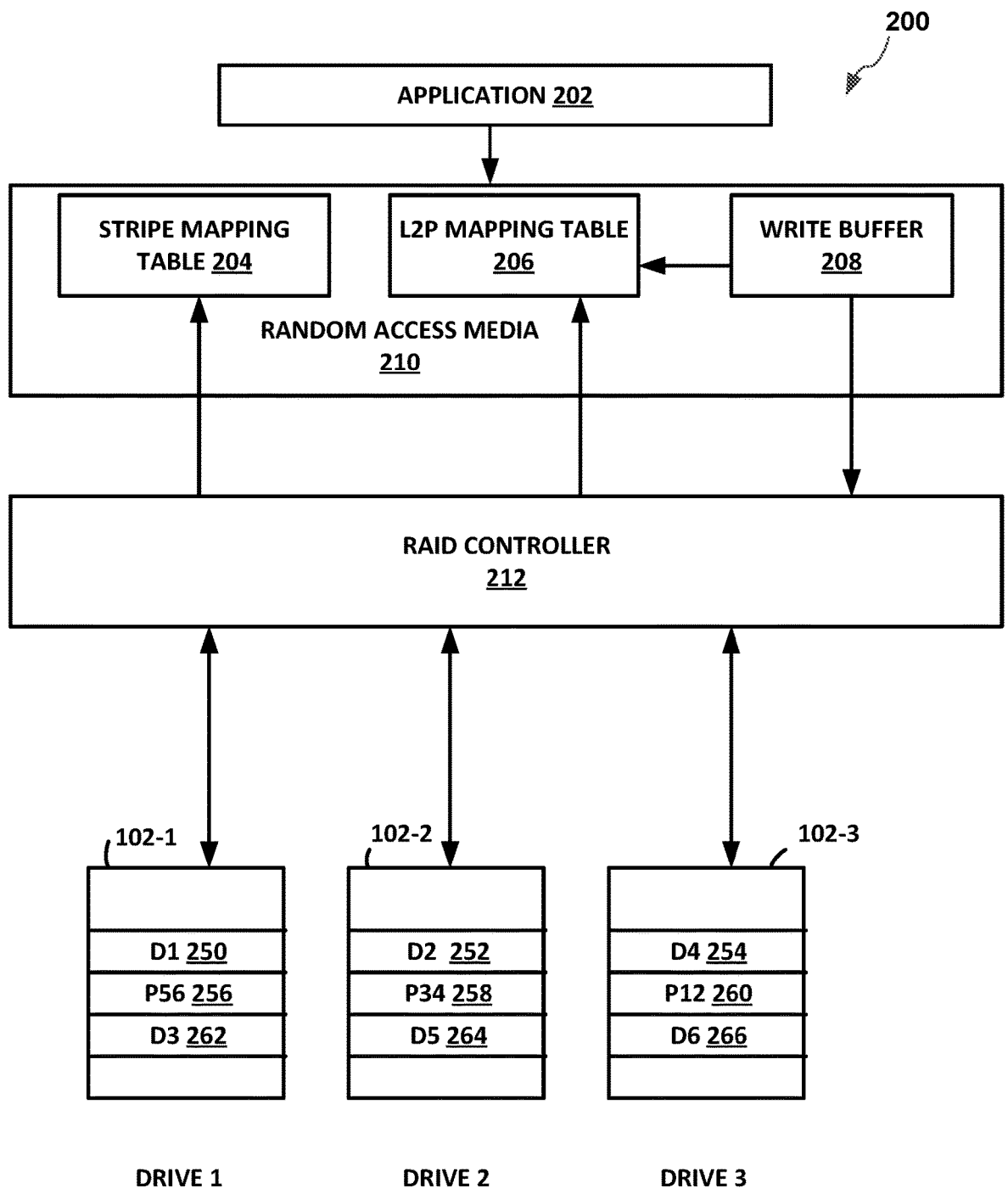
FIG. 2 is a block diagram of a storage system that includes the level 5 RAID system shown in FIG. 1 using SSDs with Zoned Namespaces.

FIG. 2 is a block diagram of a storage system 200 that includes the level 5 RAID system 100 shown in FIG. 1 using SSDs with Zoned Namespaces. The storage system 200 includes a RAID controller 212 and a Random Access Media 210 to store a Logical-to-Physical (L2P) mapping table 206, a write buffer 208 and a stripe mapping table 204.

A non-volatile memory (NVM) device is a memory whose state is determinate even if power is interrupted to the device. The block addressable non-volatile memory can be a NAND Flash memory, or more specifically, multi-threshold level NAND flash memory (for example, Single-Level Cell ("SLC"), Multi-Level Cell ("MLC"), Tri-Level Cell ("TLC"), Quad-Level Cell ("QLC"), Penta-Level Cell ("PLC") or some other NAND Flash memory).

A logical block is the smallest addressable data unit for read and write commands to access block addressable non-volatile memory in the solid state drives 102-1, 102-2, 102-3. The address of the logical block is commonly referred to as a Logical Block Address (LBA). The L2P mapping table 206 can also be referred to as an L2P address indirection table, an L2P address table or an L2P table. The L2P mapping table 206 stores a physical block address in block addressable non-volatile memory in the zoned namespace solid state drives 102-1, 102-2, 102-3 corresponding to each LBA. The random access media 210 can be a byte-addressable persistent memory, for example, 3D) XPoint (Intel® Optane® Persistent Memory).

Data from application 202 to be written to the level 5 RAID system 100 is stored in the write buffer 208 in the random access media 210. A stripe mapping table 204 in the non-volatile random access media 210 stores the structure of stripes storing data written to the level 5 RAID system 100.

The stripe mapping table 204 is updated with the relevant mapping of strips and stripes in the member solid state drives 102-1, 102-2, 102-3 after the data strips and parity strips have been written to the RAID member drives 102-1, 102-2, 102-3 and each member drive returns the assigned LBAs for the data strips and the data stripes.

In the example shown in FIG. 2, the Zone Append command has been used to write data to the RAID member drives 102-1, 102-2, 102-3 resulting in data strips and parity strips being misaligned in stripes S1, S2, S3, so that the RAID stripes are not stored in a standard RAID 5 layout as shown in the example in FIG. 1.

The Zone Append command writes data and metadata, if applicable, to the Input/Output (I/O) controller in the Solid State Drive for the zone indicated by a Zone Select Logical Block Address (ZSLBA) field included with the Zone Append command. The I/O controller assigns the data and metadata, if applicable, to a set of logical blocks within the zone. The lowest LBA of the set of logical blocks written is returned in a completion queue entry.

Referring to FIG. 2, each stripe includes two data strips and a parity strip. A first stripe includes data strip D1 250 in RAID member drive 1 102-1, data strip D2 252 in RAID member drive 2 102-2 and parity strip P12 260 in RAID member drive 102-3. A second stripe includes data strip D3 262 in RAID member drive 1 102-1, data strip D4 254 in RAID member drive 3 102-3 and parity strip P34 258 in RAID member drive 102-2. A third stripe includes data strip D5 264 in RAID member drive 2 102-2, data strip D6 266 in RAID member drive 3 102-3 and parity strip D56 256 in RAID member drive 102-1. The data block locations (logical address) of data strips and parity strips in member drives 102-1, 102-2, 102-3 that are returned in the completion queue entries for the respective Zone Append Commands sent to each of the member drives 102-1, 102-2, 102-3 are stored in the L2P mapping table 206. An entry in the L2P mapping table 206 stores the logical address of a data strip or parity strip in a member drive. The logical address of the data strip or parity strip is mapped to a physical address in the member drive by the member drive.

Figure 3:
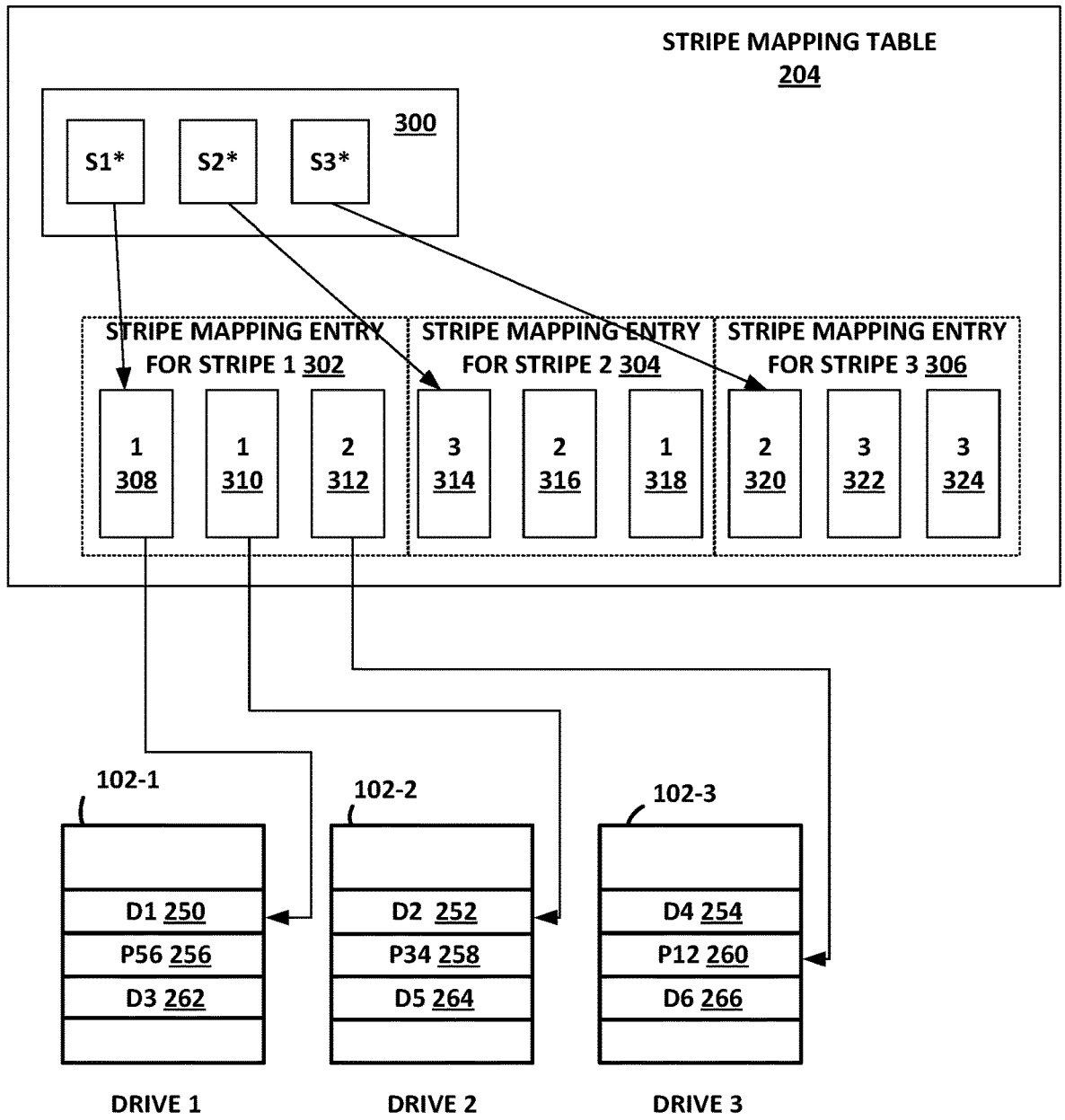
FIG. 3 is a block diagram illustrating stripe mapping entries in the stripe mapping table to map data strips and parity strips for stripes to RAID member drives.

FIG. 3 is a block diagram illustrating stripe mapping entries 302, 304, 306 in the stripe mapping table 204 to map data strips and parity strips for stripes to RAID member drives 102-1, 102-2, 102-3.

The stripe mapping table 204 is a contiguous memory space to store numbers that represent the mapping between a stripe in the RAID system and the strips in the members of the RAID system that correspond to the stripe in the RAID system. One number is stored for every strip in the RAID system. The numbers stored in the stripe mapping table 204 represent the strip number on the member of the RAID system. In addition to storing the numbers, the stripe mapping table 204 can also include an array of pointers 300, with each pointer in the array of pointers 300 to store the location of the number of the first strip in each stripe stored in the stripe mapping table 204.

In the example shown in FIG. 3, the stripe mapping entry 302 for stripe 1 stores three numbers representing the strips for stripe 1 stored on RAID member drives 102-1, 102-2, 102-3. The first strip 308 for stripe 1 is stored in strip number 1 (D1 250) on drive 1 102-1, the second strip 310 for stripe 1 is stored in strip number 1 (D2 252) on drive 2 102-2 and the third strip 312 for stripe 1 302 is stored in strip number 2 (P12 260) on drive 3 102-3.

The stripe mapping entry 304 for stripe 2 stores three numbers representing the strips for stripe 2 stored on RAID member drives 102-1, 102-2, 102-3. The first strip 314 for stripe 2 is stored in strip number 3 (D3 262) on drive 1102-1, the second strip 316 for stripe 2 is stored in strip number 2 (P34 258) on drive 2 102-2 and the third strip 318 for stripe 2 is stored in strip number 1 (D4 260) on drive 3 102-3.

The stripe mapping entry 306 for stripe 3 stores three numbers representing the strips for stripe 3 stored on RAID member drives 102-1, 102-2, 102-3. The first strip 320 for stripe 3 is stored in strip number 2 (P56 256) on drive 1 102-1, the second strip 322 for stripe 3 is stored in strip number 3 (D5 264) on drive 2 102-2 and the third strip 324 for stripe 3 is stored in strip number 3 (D6 266) on drive 3 102-3.

Figure 4:
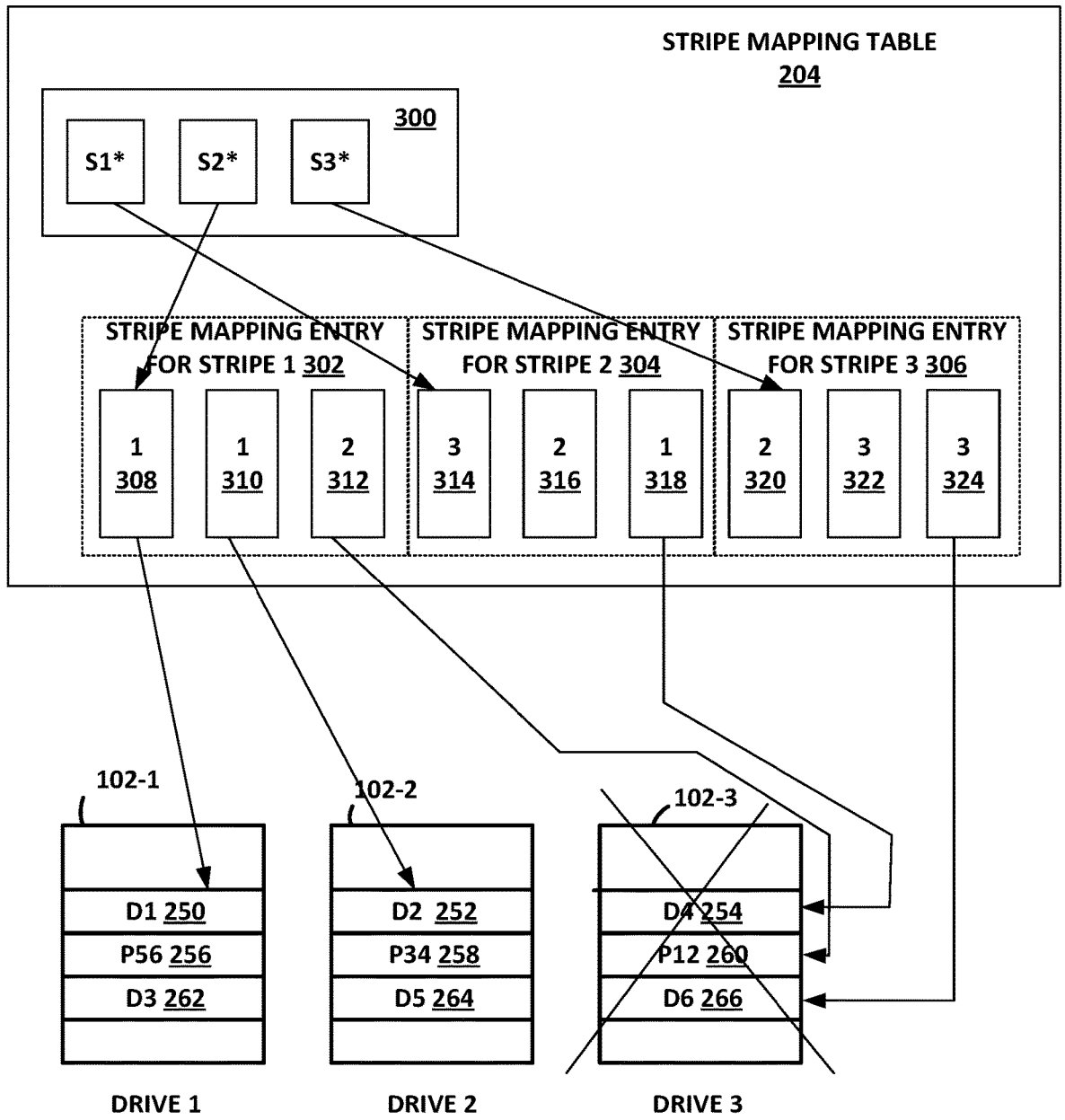
FIG. 4 is a block diagram illustrating the use of the stripe mapping entries in the stripe mapping table to perform a level 5 RAID rebuild after failure of a level 5 RAID member drive.

FIG. 4 is a block diagram illustrating the use of the stripe mapping entries 302, 304, 306 in the stripe mapping table 204 to perform a RAID rebuild after failure of a RAID member drive.

In the example shown in FIG. 4, RAID member drive 3 102-3 has failed. A RAID rebuild is performed on a replacement drive for RAID member drive 3 102-3. Strips that are stored on the failed RAID member drive 3 102-3 are recovered from the strips that are stored on non-failed RAID member drive 1 102-1 and RAID member drive 2 102-2. The recovered strips are written to the replacement drive sequentially, starting with strip number 1.

The array of stripe pointers 300 is modified, so the strip numbers stored on the failed RAID member drive 3 102-3 are sorted in ascending order. This allows the strips stored on the failed RAID member drive 3 102-3 to be recovered in the correct order and written to the replacement drive sequentially, starting with strip number 1.

As shown in the example in FIG. 4, stripe pointer S1 is modified to store the location of the number of the first strip in the stripe that stores strip 1 (D4 254) in failed RAID member drive 102-3 and stripe pointer S2 is modified to store the location of the number of the first strip in the stripe that stores strip 2 (P12 260) in failed member drive 102-3. Stripe pointer S3 stores the location of the number of the first strip in the stripe that stores strip 3 (D6 266) in failed member drive 102-3. Thus, stripes are processed such that strips stored in failed RAID member drive 102-3 are recovered sequentially and written sequentially to the replacement drive.

In an embodiment in which the stripe mapping table 204 does not include an array of pointers, the stripe mapping table 204 is searched and sorted on the fly during rebuild of the failed member drive 102-3 on the replacement drive instead of prior to the rebuild. A per stripe search is performed in the stripe mapping table 204 in the RAID system to recover each strip prior to storing each recovered strip on the replacement drive.

Figure 5:
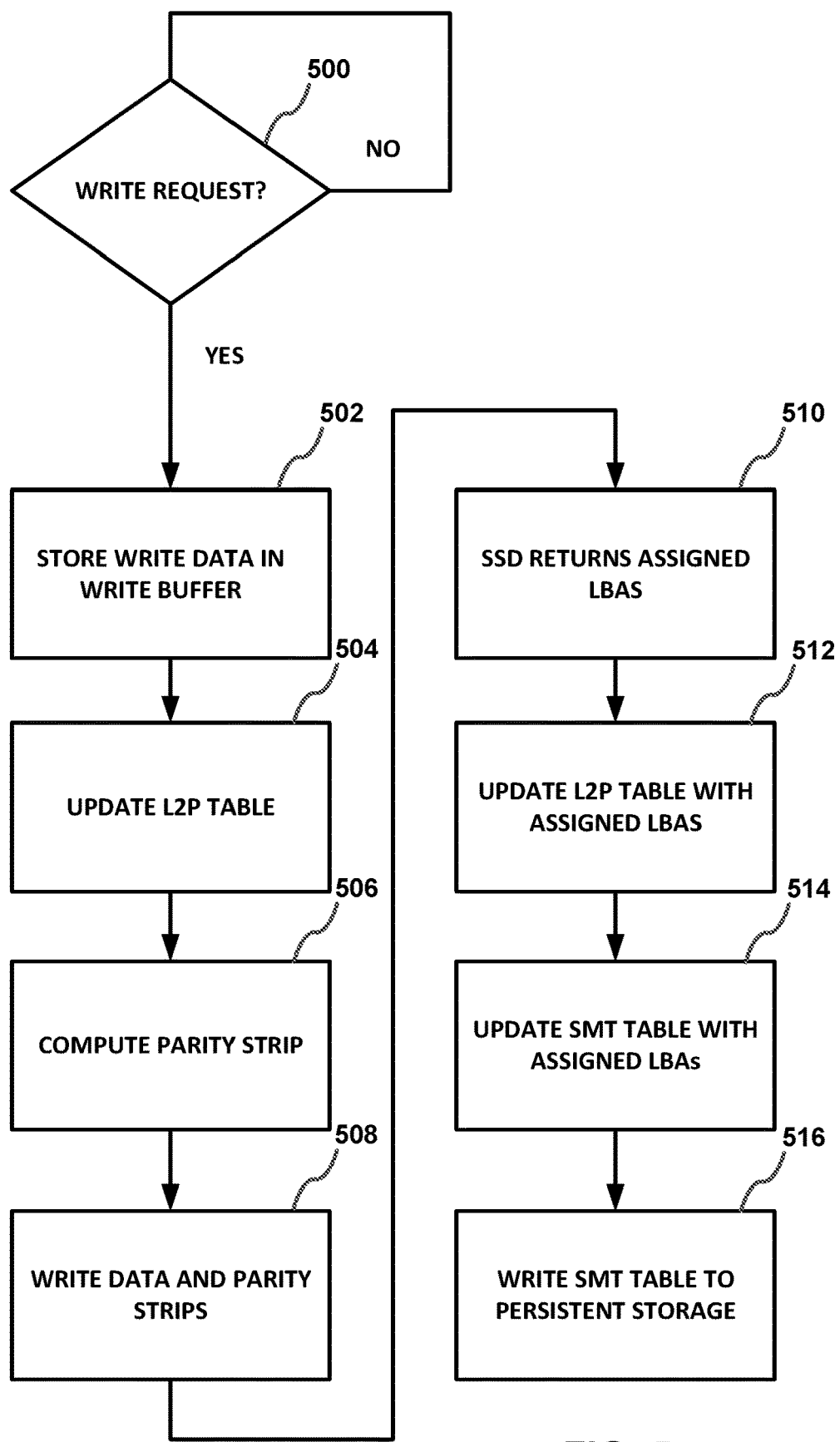
FIG. 5 is a flowgraph illustrating a write operation in the level 5 RAID system that uses SSDs with Zoned Namespaces.

FIG. 5 is a flowgraph illustrating a write operation in the level 5 RAID system that uses SSDs with Zoned Namespaces.

At block 500, if a write request to write data to the level 5 RAID system, processing continues with block 502, If not, processing continues with block 500.

At block 502, data to be written to the level 5 RAID system is stored in the write buffer 208.

At block 504, the L2P mapping table 206 is updated with the LBAs of the data stripes stored in the write buffer 208 to be written to the RAID volume.

At block 506, prior to writing the data stored in the write buffer 208 to the level 5 RAID system, the RAID controller 212 generates the parity strip for the two data strips to be stored in a stripe on the member drives 102-1, 102-2, 102-3.

At block 508, after the parity strip has been generated, the RAID controller 212 sends a Zone Append command to the member drives 102-1, 102-2, 102-3 to write the parity strip and data strips to the member drives 102-1, 102-2, 102-3.

At block 510, after each of the member drives 102-1, 102-2, 102-3 has completed the write operations, each member drive returns the LISA assigned to the data strip or parity strip in the respective member drive to the RAID controller 212.

At block 512, the RAID controller 212 updates the LBAs in the mapping table 206 with the LBAs on the RAID volume that are assigned to the data strips for each stripe by the RAID member drives 102-1, 102-2, 102-3.

At block 514, the Stripe Mapping Table 204 is updated with the number of each strip in each member drive 102-1, 102-2, 102-3 associated with each stripe written to the RAID member drives as discussed in the example shown in FIG. 3.

Figure 6:
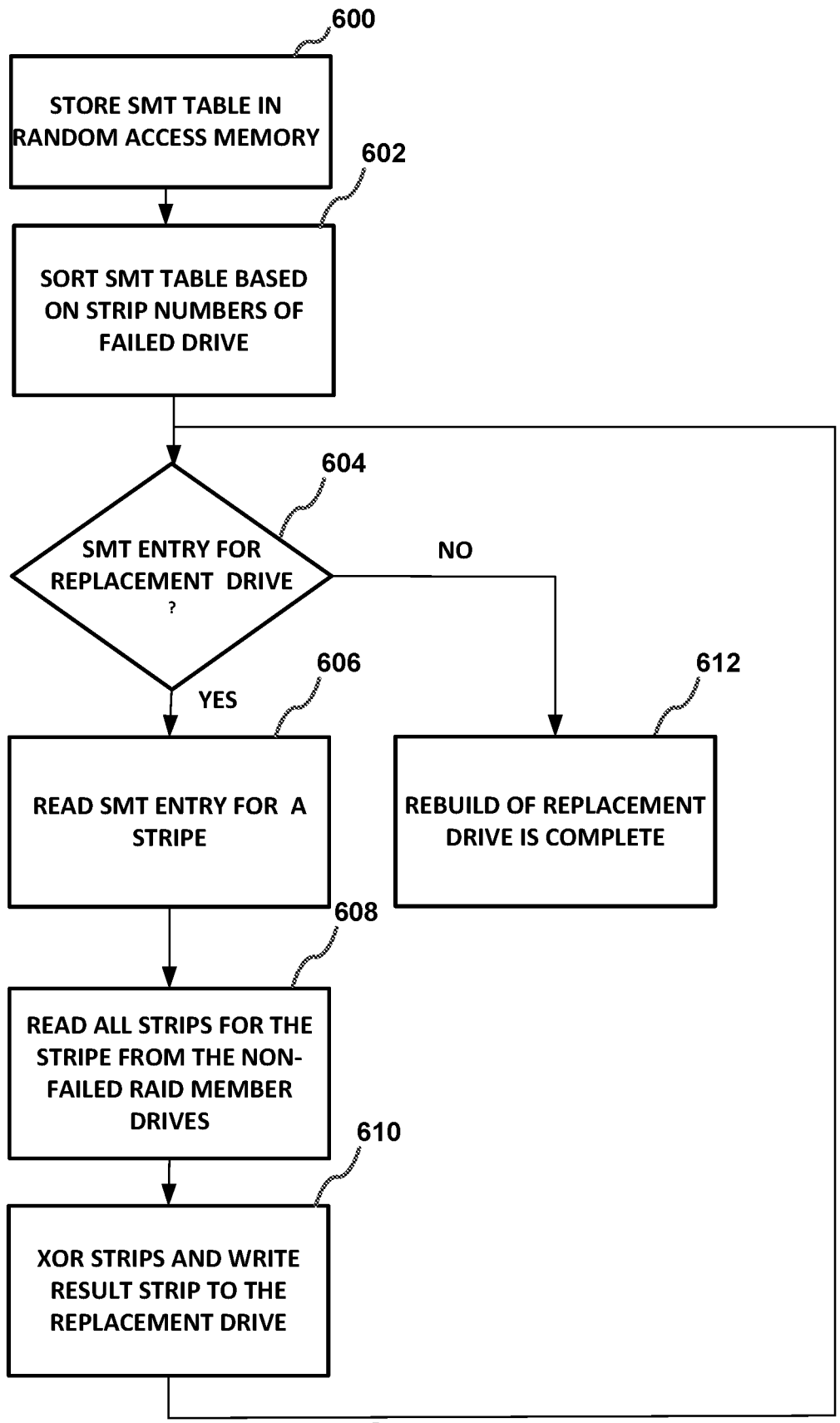
FIG. 6 is a flowgraph illustrating a RAID rebuild the level 5 RAID system that uses SSDs with Zoned Namespaces.

At block 516, the Stripe Mapping Table 204 can be written to persistent memory that can be in a solid state drive (persistent storage), FIG. 6 is a flowgraph illustrating a RAID rebuild in the level 5 RAID system that uses SSDs with Zoned Namespaces.

At block 600, upon detection that one of the members of the RAID system has failed, a RAID rebuild operation is initiated. The failed drive is replaced by a replacement drive. If the Stripe Mapping Table is stored in persistent memory or a storage device and is not in Dynamic Random Access Memory, it is copied from the persistent memory or the storage device to the Dynamic Random Access Memory in Random Access Media 210.

At block 602, the array of stripe pointers 300 is modified, so that the strip numbers stored on the failed RAID member drive are sorted in ascending order.

At block 604, if there is a SMT entry for a strip in the replacement drive that has not been written to the replacement drive, processing continues with block 606. If all strips stored on the failed drive have been written to the replacement drive, processing continues with block 612.

At block 606, the next SMT entry for a stripe is read from the Stripe Mapping Table 204.

At block 608, the strips for the stipe that are stored on t non-failed drives are read from the non-failed drives.

At block 610, an XOR operation is performed on the data stored in the two strips read from the non-failed drives to generate the data stored in the strip in failed drive. The result of the XOR operation is stored in the strip in the replacement drive.

At block 612, the rebuild of the replacement drive is complete.

An example has been described for a RAID level 5 system. Other parity-based RAID levels, for example, a level 6 RAID system can also use Zone Namespace Solid State Drives and a Stripe Mapping Table. A level 6 RAID system includes two parity drives (P and Q) and can recover from a failure of two drives. The Stripe Mapping Table includes two sets of pointers, one set for each failed drive to recover from the failure of two drives at the same time. Each set of pointers is sorted in ascending order for one of the failed drives so that each of the failed drives can rebuilt in a sequential manner.

High queue-depth workloads are enabled for RAID system using Zoned Namespace solid state drives, within a single zone allowing the full performance of Zoned Namespace drives for a RAID system. The memory used to store the SMT table is minimal because only one number is stored per RAID strip. For example, 4 Giga Bytes (GB) is used to store the SMT table with one 64-bit number stored per RAID strip for a level RAID system with three 16 Tera Bytes (TB) Solid State Drives with each strip to store 128 Kilo Bytes (KB).

An example of a RAID system with solid state drives has been described. In other embodiments, the RAID system can include hard disk drives.

Figure 7:
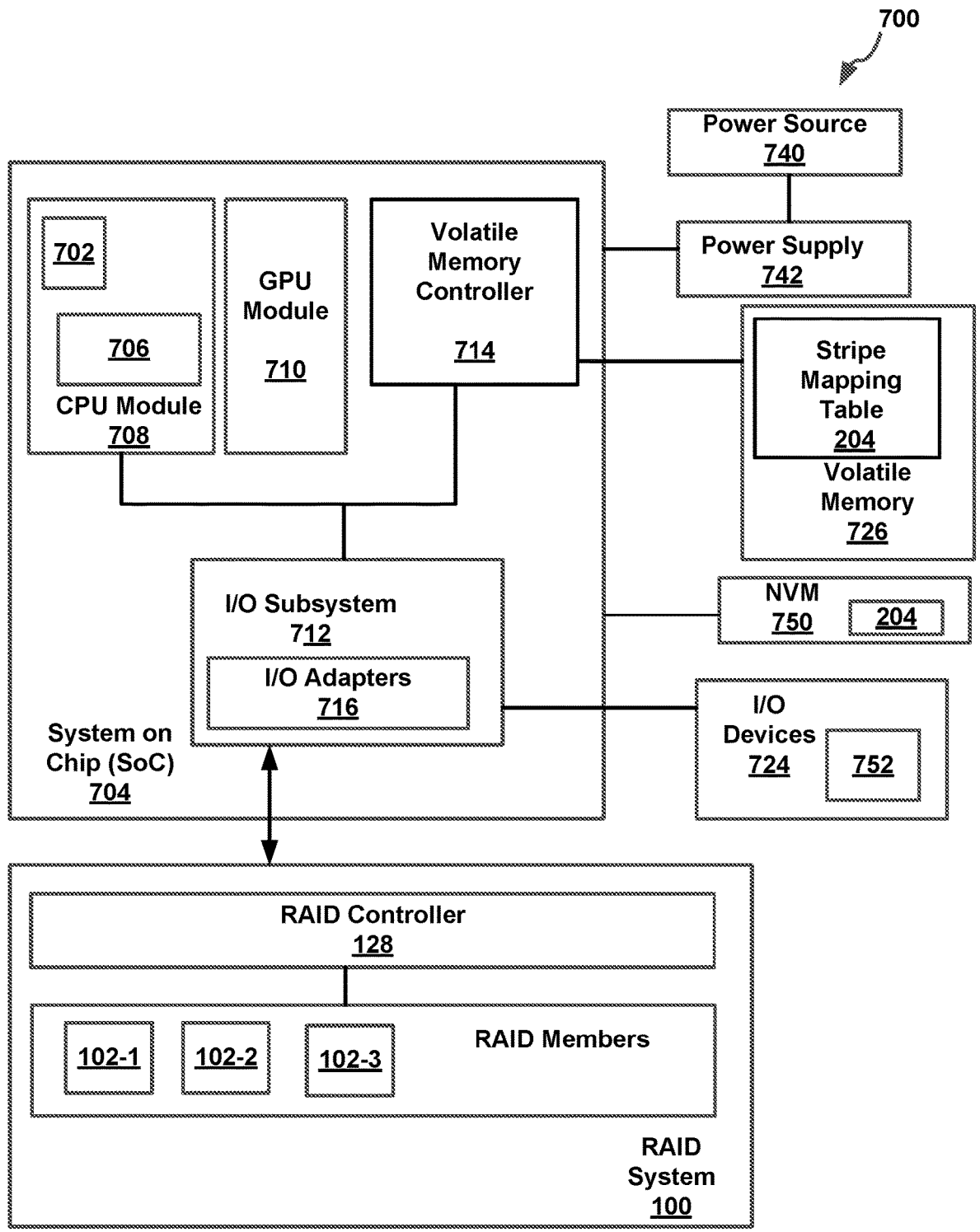
FIG. 7 is a block diagram of an embodiment of a computer system that includes a RAID system and a Stripe Mapping Table.

FIG. 7 is a block diagram of an embodiment of a computer system 700 that includes a RAID system 100 and a Stripe Mapping Table 204. Computer system 700 can correspond to a computing device including, but not limited to, a server, a workstation computer, a desktop computer, a laptop computer, and/or a tablet computer.

The computer system 700 includes a system on chip (SOC or SoC) 704 which combines processor, graphics, memory, and Input/Output (I/O) control logic into one SoC package. The SoC 704 includes at least one Central Processing Unit (CPU) module 708, a volatile memory controller 714, and a Graphics Processor Unit (GPU) 710. In other embodiments, the volatile memory controller 714 can be external to the SoC 704. The CPU module 708 includes at least one processor core 702 and a level 2 (L2) cache 706.

Although not shown, each of the processor core(s) 702 can internally include one or more instruction/data caches, execution units, prefetch buffers, instruction queues, branch address calculation units, instruction decoders, floating point units, retirement units, etc. The CPU module 708 can correspond to a single core or a multi-core general purpose processor, such as those provided by Intel® Corporation, according to one embodiment.

The Graphics Processor Unit (GPU) 710 can include one or more GPU cores and a GPU cache which can store graphics related data for the GPU core. The GPU core can internally include one or more execution units and one or more instruction and data caches. Additionally, the Graphics Processor Unit (GPU) 710 can contain other graphics logic units that are not shown in FIG. 7, such as one or more vertex processing units, rasterization units, media processing units, and codecs.

Within the I/O subsystem 712, one or more I/O adapter(s) 716 are present to translate a host communication protocol utilized within the processor core(s) 702 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 716 can communicate with external I/O devices 724 which can include, for example, user interface device(s) including a display and/or a touch-screen display 752, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

The I/O adapter(s) 716 can also communicate with a level 5 RAID system 100 with three member drives 102-1, 102-2, 102-3. The level 5 RAID system can include a Peripheral Component Interconnect Express (PCIe) adapter that is communicatively coupled using the NVMe (NVM Express) over PCIe (Peripheral Component Interconnect Express) protocol over a bus to the member drives 102-1, 102-2, 102-3. Non-Volatile Memory Express (NVMe) standards define a register level interface for host software to communicate with a non-volatile memory subsystem (for example, a Solid-state Drive (SSD)) over Peripheral Component Interconnect Express (PCIe), a high-speed serial computer expansion bus). The NVM Express standards are available at www.nvmexpress.org. The PCIe standards are available at www.pcisig.com.

NVM device 750 can include a byte-addressable write-in-place three dimensional crosspoint memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications. The JEDEC standards are available at www.jedec.org. The stripe mapping table 204 can be stored in volatile memory 726 or Non-Volatile Memory (NVM) 750.

Power source 740 provides power to the components of system 700. More specifically, power source 740 typically interfaces to one or multiple power supplies 742 in system 700 to provide power to the components of system 700. In one example, power supply 742 includes an AC to DC (alternating current to direct current) adapter to plug into a wall outlet. Such AC power can be renewable energy (e.g., solar power) power source 740. In one example, power source 740 includes a DC power source, such as an external AC to DC converter. In one example, power source 740 or power supply 742 includes wireless charging hardware to charge via proximity to a charging field. In one example, power source 740 can include an internal battery or fuel cell source.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A non-transitory machine-readable storage medium comprising a plurality of instructions stored thereon that, in response to being executed can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.).

A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. An apparatus comprising:
   a plurality of solid state drives, each of the solid state drives including a non-volatile memory divided into a set of equally-sized zones;
   a Redundant Array of Independent Disks (RAID) controller to write a stripe including data strips and a parity strip to the plurality of solid state drives, each of the data strips and the parity strip stored in a different one of the solid state drives; and
   a stripe mapping table to include a stripe mapping entry for each stripe written to the plurality of solid state drives, the stripe mapping entry including numbers assigned to each of the solid state drives to store the data strips and the parity strip for the stripe.

2. The apparatus of claim 1, wherein each zone includes contiguous non-overlapping ranges of logical block addresses.

3. The apparatus of claim 1, wherein the RAID controller and plurality of solid state drives configured as a level 5 RAID system and each of the solid state drives is a member of the level 5 RAID system.

4. The apparatus of claim 3, wherein a number of solid state drives is 3, a first solid state drive to store a first data strip for the stripe, a second solid state drive to store a second data strip for the stripe and a third solid state drive to store the parity strip for the stripe, numbers assigned to the first solid state drive, second solid state drive and third solid state drive stored in the stripe mapping entry for the stripe in the stripe mapping table.

5. The apparatus of claim 3, wherein the stripe mapping table to include a stripe pointer to each stripe mapping entry, the stripe pointers reordered prior to a RAID rebuild to recover strips stored on a failed member drive in a correct order and write recovered strips sequentially to a replacement drive.

6. The apparatus of claim 1, wherein the RAID controller and plurality of solid state drives configured as a level 6 RAID system and each of the solid state drives is a member of the level 6 RAID system.

7. One or more non-transitory machine-readable storage medium comprising a plurality of instructions stored thereon that, in response to being executed, cause a system to:
   write, by a Redundant Array of Independent Disks (RAID) controller, a stripe including data strips and a parity strip to a plurality of solid state drives, each of the data strips and the parity strip stored in a different one of the solid state drives, each of the solid state drives including a non-volatile memory, the non-volatile memory divided into a set of equally-sized zones; and
   store, in a stripe mapping table, a stripe mapping entry for each stripe written to the plurality of solid state drives, the stripe mapping entry including numbers assigned to each of the solid state drives to store the data strips and the parity strip for the stripe.

8. The one or more non-transitory machine-readable storage medium of claim 7, wherein each zone includes contiguous non-overlapping ranges of logical block addresses.

9. The one or more non-transitory machine-readable storage medium of claim 7, wherein the RAID controller and plurality of solid state drives configured as a level 5 RAID system and each of the solid state drives is a member of the level 5 RAID system.

10. The one or more non-transitory machine-readable storage medium of claim 9, wherein a number of solid state drives is 3, a first solid state drive to store a first data strip for the stripe, a second solid state drive to store a second data strip for the stripe and a third solid state drive to store the parity strip for the stripe, numbers assigned to the first solid state drive, second solid state drive and third solid state drive stored in the stripe mapping entry for the stripe in the stripe mapping table.

11. The one or more non-transitory machine-readable storage medium of claim 9, wherein the stripe mapping table to include a stripe pointer to each stripe mapping entry, the stripe pointers reordered prior to a RAID rebuild to recover strips stored on a failed member drive in a correct order and write recovered strips sequentially to a replacement drive.

12. The one or more non-transitory machine-readable storage medium of claim 7, wherein the RAID controller and plurality of solid state drives configured as a level 6 RAID system and each of the solid state drives is a member of the level 6 RAID system.

13. A system comprising:
   a processor;
   a plurality of solid state drives, each of the solid state drives including a non-volatile memory divided into a set of equally-sized zones;
   a Redundant Array of Independent Disks (RAID) controller to write a stripe including data strips and a parity strip to the plurality of solid state drives, each of the data strips and the parity strip stored in a different one of the solid state drives; and
   a stripe mapping table to include a stripe mapping entry for each stripe written to the plurality of solid state drives, the stripe mapping entry including numbers assigned to each of the solid state drives to store the data strips and the parity strip for the stripe.

14. The system of claim 13, wherein each zone includes contiguous non-overlapping ranges of logical block addresses.

15. The system of claim 13, wherein the RAID controller and plurality of solid state drives configured as a level 5 RAID system and each of the solid state drives is a member of the level 5 RAID system.

16. The system of claim 15, wherein a number of solid state drives is 3, a first solid state drive to store a first data strip for the stripe, a second solid state drive to store a second data strip for the stripe and a third solid state drive to store the parity strip for the stripe, numbers assigned to the first solid state drive, second solid state drive and third solid state drive stored in the stripe mapping entry for the stripe in the stripe mapping table.

17. The system of claim 15, wherein the stripe mapping table to include a stripe pointer to each stripe mapping entry, the stripe pointers reordered prior to a RAID rebuild to recover strips stored on a failed member drive in a correct order and write recovered strips sequentially to a replacement drive.

18. The system of claim 13, wherein the RAID controller and plurality of solid state drives configured as a level 6 RAID system and each of the solid state drives is a member of the level 6 RAID system.

19. The system of claim 13, further comprising:
   a power supply to provide power to the system.

* * * * *